(12) United States Patent
Bar-Shalom

(10) Patent No.: US 8,718,406 B2
(45) Date of Patent: May 6, 2014

(54) METHOD AND APPARATUS FOR VIDEO FRAME ROTATION

(75) Inventor: Ofer Bar-Shalom, Kiryat Ono (IL)

(73) Assignee: Marvell World Trade Ltd., St. Michael (BB)

( * ) Notice: Subject to any disclaimer, the term of this patent is extended or adjusted under 35 U.S.C. 154(b) by 93 days.

(21) Appl. No.: 13/336,591

(22) Filed: Dec. 23, 2011

(65) Prior Publication Data

US 2012/0162524 A1    Jun. 28, 2012

Related U.S. Application Data

(60) Provisional application No. 61/427,028, filed on Dec. 23, 2010.

(51) Int. Cl.
*G06K 9/32* (2006.01)
*H04N 9/74* (2006.01)

(52) U.S. Cl.
USPC .......................................... 382/297; 348/583

(58) Field of Classification Search
USPC ................. 382/297, 296, 295, 299, 232, 234; 348/583, 580; 345/648–659
See application file for complete search history.

(56) References Cited

U.S. PATENT DOCUMENTS

| 7,062,101 | B2 * | 6/2006 | Schwartz ...................... 382/248 |
| 7,215,444 | B2 * | 5/2007 | Hains ........................... 358/3.09 |
| 7,535,474 | B1 * | 5/2009 | Scholander et al. .......... 345/531 |
| 7,576,758 | B2 * | 8/2009 | Kothandaraman et al. ... 345/658 |
| 7,580,578 | B1 * | 8/2009 | Onno et al. ................... 382/232 |
| 7,876,977 | B2 * | 1/2011 | Walton et al. ................. 382/296 |

* cited by examiner

*Primary Examiner* — Yon Couso

(57) ABSTRACT

Aspects of the disclosure provide a method for video frame rotation. The method includes receiving a first tile from among a plurality of tiles forming a video frame. The first tile includes a first plurality of macro pixels where each macro pixel interleaves at least one pair of neighboring pixels in a first orientation. Further, the method includes de-interleaving the first plurality of macro pixels into first pixels, mapping the first pixels into first rotated neighboring pixels in a second orientation, and interleaving the first rotated neighboring pixels into first rotated macro pixels forming a first rotated tile.

20 Claims, 13 Drawing Sheets

410C

| T29' | T22' | T15' | T8'  | T1' |
|------|------|------|------|-----|
| T30' | T23' | T16' | T9'  | T2' |
| T31' | T24' | T17' | T10' | T3' |
| T32' | T25' | T18' | T11' | T4' |
| T33' | T26' | T19' | T12' | T5' |
| T34' | T27' | T20' | T13' | T6' |
| T35' | T28' | T21' | T14' | T7' |

FIG. 4C

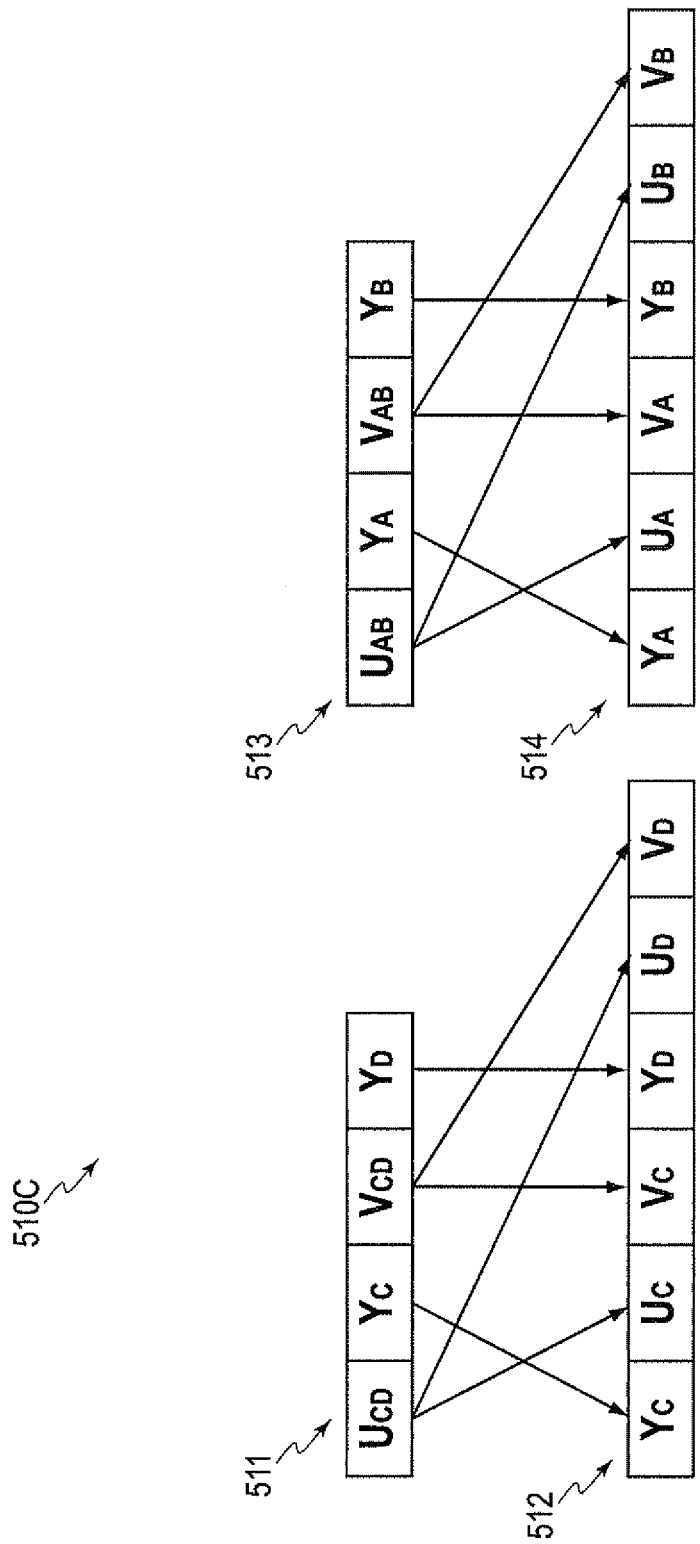

METHOD AND APPARATUS FOR VIDEO
FRAME ROTATION

INCORPORATION BY REFERENCE

This application claims the benefit of U.S. Provisional Application No. 61/427,028 "Method and Apparatus for Video Frame Rotation" filed on Dec. 23, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a video capture apparatus captures and processes video frames according to a native imaging orientation. When the video capture apparatus is positioned at an orientation other than the native imaging orientation, the captured video frames need to be rotated prior to displaying to avoid rotating a display screen or avoid requiring a viewer to tilt his or her head.

SUMMARY

Aspects of the disclosure provide a method for video frame rotation. The method includes receiving a first tile from among a plurality of tiles forming a video frame. The first tile includes a first plurality of macro pixels where each macro pixel interleaves at least one pair of neighboring pixels in a first orientation. Further, the method includes de-interleaving the first plurality of macro pixels into first pixels, mapping the first pixels into first rotated neighboring pixels in a second orientation, and interleaving the first rotated neighboring pixels into first rotated macro pixels forming a first rotated tile.

In an embodiment, the method includes receiving a second tile from among the plurality of tiles forming the video frame. The second tile includes a second plurality of macro pixels where each macro pixel interleaves at least one pair of neighboring pixels in the first orientation. Then, the method includes de-interleaving the second plurality of macro pixels into second pixels, mapping the second pixels into second rotated neighboring pixels in the second orientation, and interleaving the second rotated neighboring pixels into second rotated macro pixels forming the second rotated tile. It is noted that the first tile and the second tile can be processed in series or in parallel.

In an embodiment, the method includes fetching the plurality of tiles from a storage that stores the video frame in a sequence according to a rotation angle to rotate the video frame from the first orientation to the second orientation. In another embodiment, the method includes writing the first rotated tile to a storage to store the rotated video frame at an address according to a rotation angle to rotate the video frame from the first orientation to the second orientation.

According to an aspect of the disclosure, the method includes detecting that a video capturing device configured to generate the video frame according to the first orientation is positioned at the second orientation. Further, in an example, the method includes previewing the rotated video frame prior to video-encoding. In another example, the method includes video-encoding the rotated video frame after video frame rotation. In another example, the method includes decoding an encoded video frame before video frame rotation. In another example, the method includes displaying after video frame rotation of the decoded video frame.

To map the first pixels into the first rotated neighboring pixels in the second orientation, in an embodiment, the method includes mapping the first pixels into the first rotated neighboring pixels in the second orientation that is rotated from the first orientation by one of 90°, 180° and 270°.

Aspects of the disclosure provide a circuit. The circuit includes an input buffer, a first tile rotator, and an output buffer. The input buffer is configured to buffer a first tile from among a plurality of tiles forming a video frame. The first tile includes a first plurality of macro pixels that each macro pixel interleaves at least one pair of neighboring pixels in a first orientation. The first tile rotator is configured to de-interleave the first plurality of macro pixels into first pixels, map the first pixels into first rotated neighboring pixels in a second orientation, and interleave the first rotated neighboring pixels into first rotated macro pixels. The output buffer is configured to buffer the first rotated macro pixels to form a first rotated tile.

Aspects of the disclosure provide an electronic system. The electronic system includes a system on chip (SOC) having the circuit implemented on the SOC.

BRIEF DESCRIPTION OF THE DRAWINGS

Various embodiments of this disclosure that are proposed as examples will be described in detail with reference to the following figures, wherein like numerals reference like elements, and wherein:

FIGS. 4A-4D show plots of tile based video frame rotation example according to an embodiment of the disclosure;

FIGS. 5A-5F show a tile rotation example according to an embodiment of the disclosure.

DETAILED DESCRIPTION OF EMBODIMENTS

Figure 1:
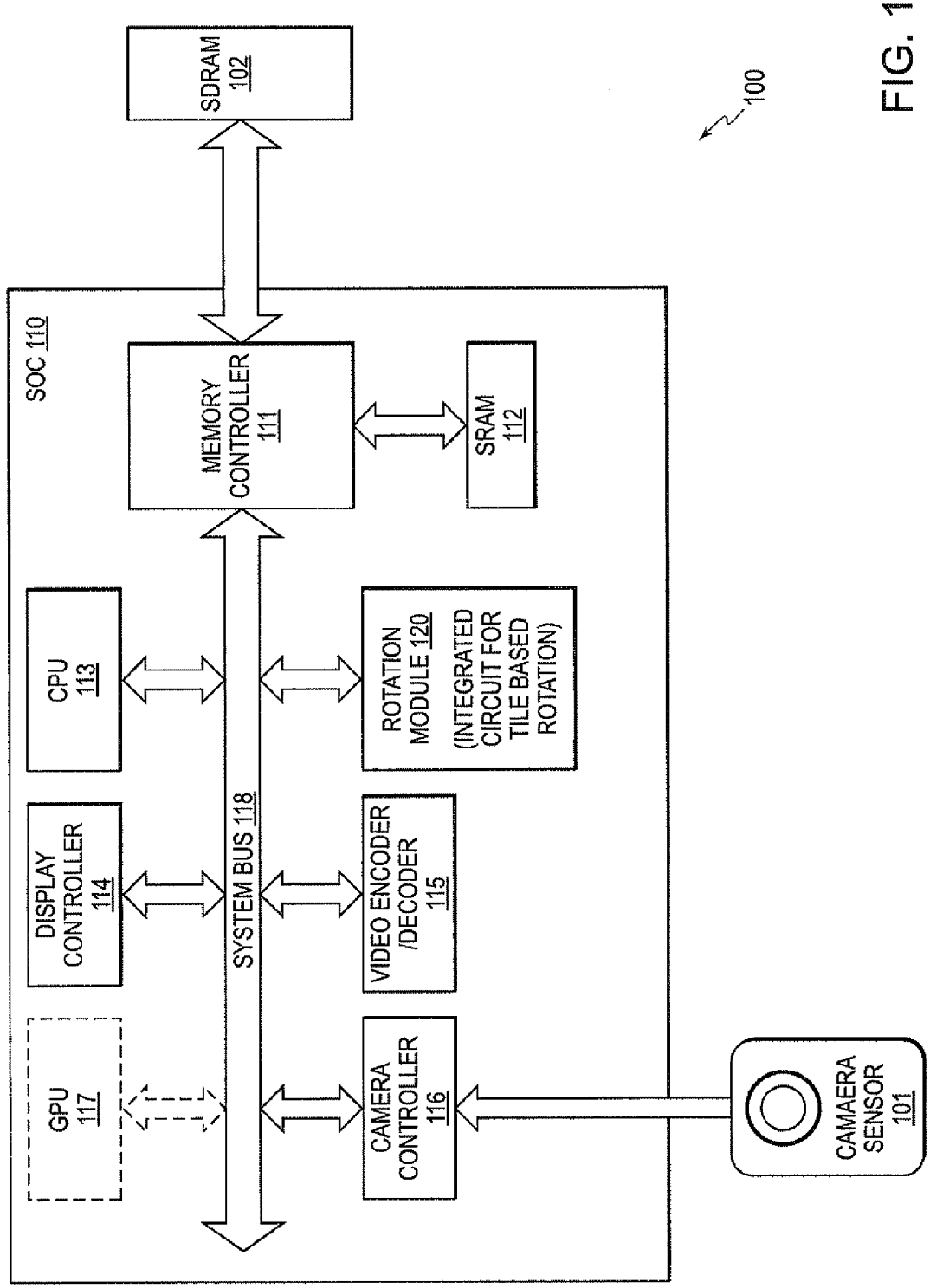
FIG. 1 shows a block diagram of a system example 100 according to an embodiment of the disclosure.

FIG. 1 shows a block diagram of a system example 100 according to an embodiment of the disclosure. The system 100 includes a rotation module 120 implemented as an integrated circuit module dedicated for video frame rotation. According to an embodiment of the disclosure, the rotation module 120 is configured as a dedicated hardware module that has a much smaller number of transistors compared to a processing unit for a more general purpose, such as central processing unit (CPU), graphics processing unit (GPU), and the like. Thus, using the rotation module 120 for video frame rotation consumes much smaller power than using the CPU or GPU for video frame rotation. In addition, CPU or GPU is released from video frame rotation and can perform other functions at the same time when the rotation module 120 performs the video frame rotation, for example.

According to an embodiment of the disclosure, the rotation module 120 is integrated with other suitable circuits on an integrated circuit chip, such as a system on chip (SOC). In the FIG. 1 example, the system 100 includes an SOC 110 having the rotation module 120. In addition, in the FIG. 1 example, the SOC 110 includes a memory controller 111, a static random access memory (SRAM) 112, a CPU 113, a display controller 114, a video encoder/decoder 115, a camera controller 116, and a system bus 118. In the embodiment seen in FIG. 1, the rotation module 120 is configured as a module that is separate from the CPU 113 and a GPU 117. These elements are coupled together, in an embodiment, as shown in FIG. 1.

The memory controller 111 controls read access and write access to on chip memory and off-chip memory, such as the SRAM 112 on the SOC 110, a synchronous dynamic random access memory (SDRAM) 102 that is out of the SOC 110, and other suitable memory devices.

In an embodiment, the CPU 113 is configured for general purpose, and can execute suitable instruction codes to perform desired functions, such as system control for the system 100, video editing, and the like. In an embodiment, the SOC 110 includes a GPU 117 configured for general graphic processing, such as video editing, and the like.

The camera controller 116 enables the SOC 110 to communicate with an camera sensor 101. In an embodiment, the camera controller 116 receives a data stream corresponding to video frames captured by the camera sensor 101 and provides the data stream to other part of the SOC 110 via the system bus 118. In an example, the camera sensor 101 is configured to have a specific orientation referred to as a native imaging orientation. In an embodiment, the camera sensor 101 is configured to capture video frames, and send the pixel data of a video frame line by line in the native imaging orientation.

It is noted that, in an example, the pixel data is in a packed format, such as a YUV (YCbCr) format, and the like. In an example, two pixels A and B are neighboring (adjacent) pixels. Pixel A has components $Y_A U_A V_A$, and pixel B has components $Y_B U_B V_B$. The components of pixel A and pixel B are interleaved to form a macro pixel AB having components $U_{AB} Y_A V_{AB} Y_B$. $U_{AB}$ is an average of $U_A$ and $U_B$, and $V_{AB}$ is an average of $V_A$ and $V_B$.

The display controller 114 enables the SOC 110 to communicate with a display apparatus (not shown) to display video frames. In an embodiment, the display controller 114 receives a data stream corresponding to video frames for displaying from other part of the SOC 110 via the system bus 118, and provides the data stream to the display apparatus. In an example, the display apparatus is configured to have a specific orientation referred to as a display orientation for displaying, and to display data stream of a video frame in the form of line by line in the display orientation.

It is noted that the display controller 114 can include any suitable interface that is compatible with the display apparatus. In an example, the display controller 114 includes a high definition multimedia interface (HDMI) that is compatible with a high definition display apparatus. In another example, when the display apparatus uses a RGB format, the display controller 114 includes a conversion module to convert a data stream of YUV format to a data stream of RGB format.

The video encoder/decoder 115 implements various video coding standards and executes the video encoding or decoding operations.

According to an embodiment of the disclosure, the rotation module 120 is configured to rotate a video frame of fixed angles, such as 90°, 180° and 270°.

Further, according to an aspect of the disclosure, the rotation module 120 is configured to be a tile based rotation module that rotates the video frame in the unit of tile. In an example, a video frame is divided into a plurality of tiles. Each tile includes a matrix of pixels. According to an aspect of the disclosure, for each pixel in the tile, the tile also includes its neighboring pixel in a first orientation and neighboring pixel in a second orientation that is rotated from the first orientation by an angle, such as 90°, 180° and 270°. In an example, each tile includes all the pixel information to rotate the tile. Thus, in an example, the plurality of tiles of the video frame can be independently rotated. Then, the rotated tiles are suitably arranged to form the rotated video frame. The tile-based rotation enables simple hardware implementation, and enables parallel rotation of multiple tiles that significantly speeds up video frame rotation.

During video capture, the camera sensor 101 can be positioned at an orientation that is different from the native imaging orientation. In an example, the camera sensor 101 has a rectangular shape, and the native imaging orientation is a landscape orientation. When the camera sensor 101 is positioned in landscape orientation, the video frames captured by the camera sensor 101 are sent to the SOC 110 in the form of a data stream of pixel data line by line in landscape orientation. It is noted, in an example, the pixel data can be sent in the form of macro pixels that interleave neighboring pixels of a video frame. In an embodiment, the data stream corresponding to the video frames is suitably encoded and stored. Further, the stored encoded data stream corresponding to the video frames is decoded and sent to, for example, a rectangular shaped display apparatus positioned in landscape orientation. The captured video frames of landscape orientation are then displayed in landscape orientation.

When the camera sensor 101 is positioned in a portrait orientation, the video frames captured by the camera sensor 101 are sent to the SOC 110 in the form of a data stream of pixel data line by line in landscape orientation even through the image was captured in the portrait orientation. It is noted, in an example, the pixel data can be sent in the form of macro pixels that interleave neighboring pixels in landscape orientation of a video frame. The rotation module 120 processes the data stream to rotate the video frames from landscape orientation to portrait orientation, such that the rotated video frames can be displayed in portrait orientation.

It is noted that the rotation module 120 can be used in different image processing pipelines to rotate a video frame. In an example, the rotation module 120 is used in a capture pipeline. In the capture pipeline, after the video frames are captured and sent to the SOC 110, the rotation module 120 rotates video frames before encoding the video frames using the video encoder/decoder 115. In another example, the rotation module 120 is used in a playback pipeline. In the play back pipeline, after the video encoder/decoder 116 decodes the video frames, the rotation module 120 rotates the video frames. The rotated video frames are sent to the display controller 114 for displaying.

In an embodiment, when the SOC 110 receives the data stream of pixel data line by line in landscape orientation of the video frames, the video frames are stored in the on-chip memory or in suitable off-chip memory. When the video frames are captured in portrait orientation, the SOC 110 rotates the video frames in the capture pipeline or in the play back pipeline.

In an example, when the video frames are captured in portrait orientation, the rotation module 120 rotates the video frames by, for example, 90° into the portrait orientation. The rotated video frames are suitably encoded and stored. Further, the rotated video frames can be suitably decoded and sent to, for example, the rectangular shaped display apparatus positioned in landscape orientation to display the video frames in the portrait orientation. It is noted that, in an example, without rotation, the captured video frames of the portrait orientation would be displayed in landscape orientation, and a viewer may need to tilt his or her head to view the video frames.

In another example, when the video frames are captured in portrait orientation, the video frames are encoded and stored in the on-chip memory or suitable off-chip memory. To display the video frames, the encoded video frames are suitably decoded. Then, the rotation module 120 rotates the decoded video frames by, for example, 90° into portrait orientation. Then, the rotated video frames are sent to, for example, the rectangular shaped display apparatus positioned in landscape orientation. Then, the video frames captured in portrait orientation are displayed in portrait orientation at the display apparatus. It is noted that, in an example, without rotation, the captured video frames of the portrait orientation would be displayed in landscape orientation, and a viewer may need to tilt his or her head to view the video frames.

According to an embodiment of the disclosure, the rotation module 120 uses a tile based rotation technique to rotate a video frame. In an example, each video frame is divided into a plurality of tiles that each tile is a matrix of N×M pixels (N and M are positive even numbers). The rotation module 120 includes a tile rotator that respectively rotates the plurality of tiles according to a rotation angle. Further, the rotation module 120 arranges the rotated tiles together according to the rotation angle to form the rotated video frame. In an example, the rotation module 120 stores the rotated tiles at memory addresses that are determined based on the rotation angle to form the rotated video frame.

It is noted that, in an embodiment, the system 100 includes an orientation sensor (not shown) configured to detect the orientation of camera sensor 101 when the video frames are captured. Based on the detected orientation, the rotation module 120 suitably rotates, or refrains from rotating, the video frames to conform to an orientation of a viewing device.

In the FIG. 1 example, the system bus 118 couples various elements in the SOC 110 together to enable data transmission among the various elements. It is noted that the SOC 110 can use other suitable architecture to couple the various elements together.

Figure 2A:
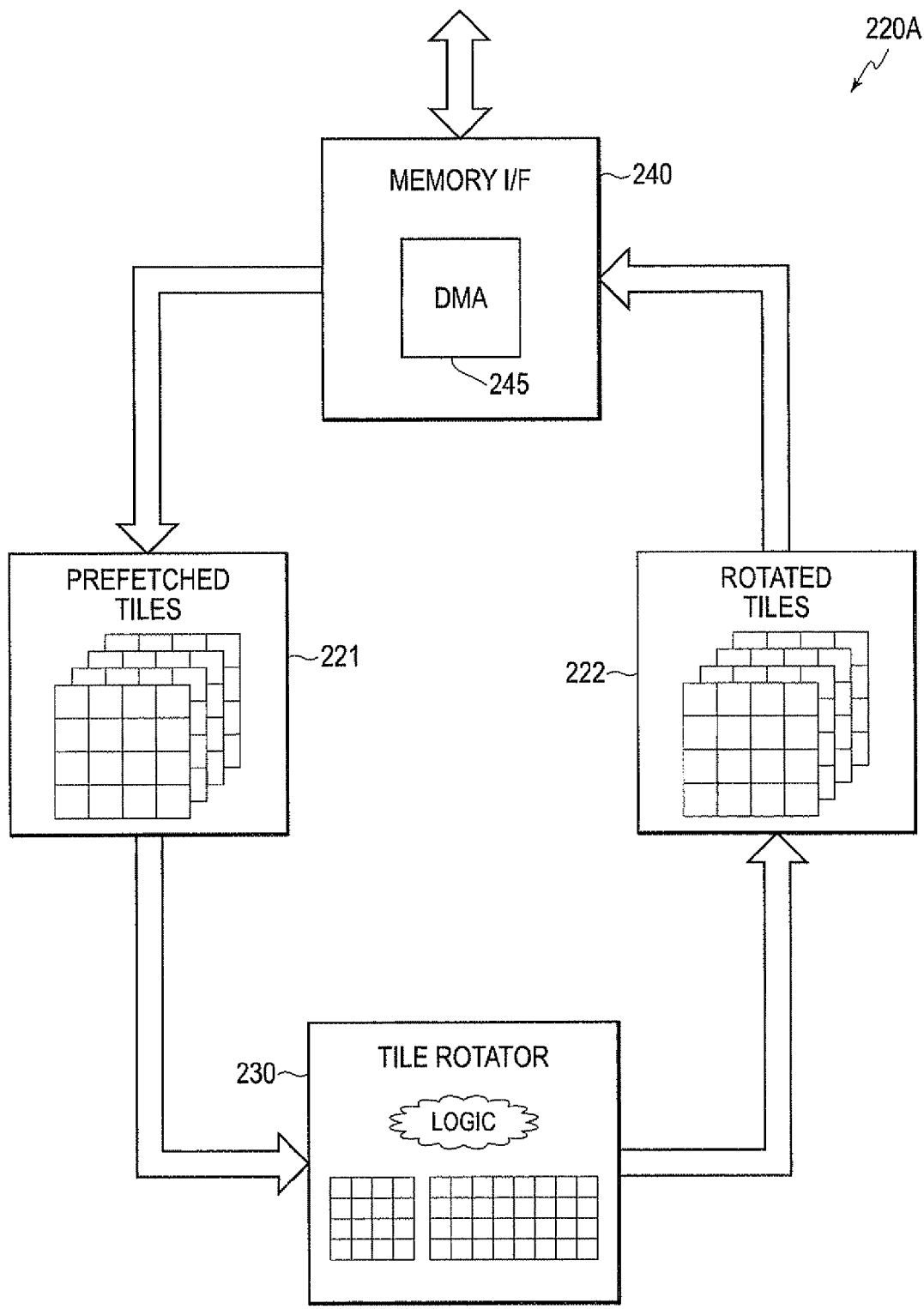
FIG. 2A shows a block diagram of a video frame rotator example 220A according to an embodiment of the disclosure.

FIG. 2A shows a block diagram of a rotation module example 220A according to an embodiment of the disclosure. The rotation module 220A includes a memory interface 240, a first memory 221, a second memory 222 and a tile rotator 230. These elements are coupled together, in an embodiment, as shown in FIG. 2A.

The memory interface 240 is configured to access a memory, such as SDRAM 102, to fetch tiles within a video frame for rotation, and to access the memory to store the rotated tiles. In an embodiment, the memory interface 240 includes a bus interface (not shown) configured to communicate with a system bus, such as the system bus 118. Further, in an example, the memory interface 240 includes a direct memory access (DMA) 245 to determine addresses of the memory for accessing.

According to an aspect of the disclosure, the memory interface 240 is configured to access the memory to fetch tiles to be rotated according to a sequence based on the rotation angle. According to another aspect of the disclosure, the memory interface 240 is configured to access the memory to write tiles that have been rotated to the proper address based on the rotation angle.

According to another aspect of the disclosure, the memory interface 240 is configured to access the memory in an order to optimize memory access speed. According to an embodiment of the disclosure, SDRAM throughput and system memory access latency are dependent on randomness of memory transactions. The memory interface 240 is configured to implement a fetching/writing back policy to access the memory in an order to optimize the performance of memory transactions.

The first memory 221 and the second memory 222 are configured to buffer pixel data of tiles, and to mitigate real-time restrictions imposed on the tile rotator 230 due to system bus or memory latencies and other elements competing on accessing the shared system resources, such as the system bus and memory, along with the tile rotator 230. In an embodiment, the first memory 221 and the second memory 222 are first-in-first-out buffers. In an example, the first memory 221 and the second memory 222 are local memories within the rotation module 220A. The first memory 221 is configured to buffer pixel data of a plurality of tiles to be rotated. The second memory 222 is configured to buffer pixel data of a plurality tiles that have been rotated.

According to an aspect of the disclosure, the tile rotator 230 is configured to rotate pixels in a tile. In an embodiment, pixel data of a video frame received by the tile rotator 230 is in a packed (interleaved) format. In an example, the camera sensor 101 sends pixel data in a YUV (YCbCr) format.

In an example, the tiles received by the tile rotator 230 include macro pixels that interleave neighboring pixels in a first orientation. To rotate a tile of pixels in the packed format by a rotation angle to a second orientation, the tile rotator 230 first de-interleaves the macro pixels into separate pixels or pixel components. Then, the tile rotator 230 maps the separate pixels according to the rotation angle to form neighboring pixels in the second orientation. Then, the tile rotator 230 interleaves the newly formed neighboring pixels to generate new macro pixels in the second orientation.

Figure 2B:
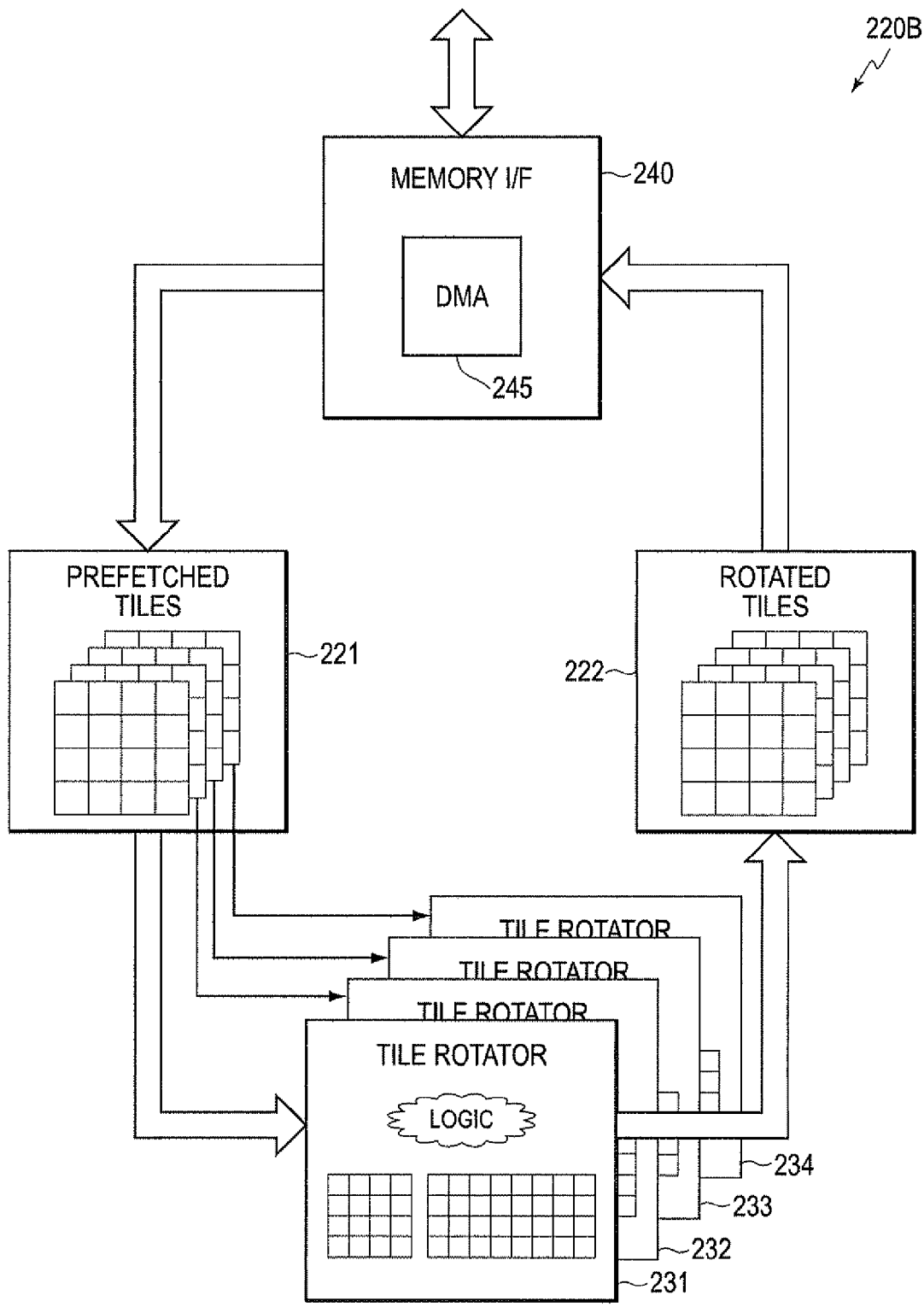
FIG. 2B shows a block diagram of another video frame rotator example 220B according to an embodiment of the disclosure.

FIG. 2B shows a block diagram of another rotation module example 220B according to an embodiment of the disclosure. The rotation module 220B utilizes certain components that are identical or equivalent to those used in the rotation module 220A; the description of these components has been provided above and will be omitted here for clarity purposes. However, in this embodiment, the rotation module 220B includes multiple tile rotators 231-234. In an embodiment, each of the multiple tile rotators 231-234 is configured similarly to the tile rotator 230, and the multiple tile rotators 231-234 are configured to operate in a synchronous manner or in an asynchronous manner to respectively rotate multiple tiles forming an image frame. Thus, the rotation module 220B has a higher throughput than the rotation module 220A.

Figure 3:
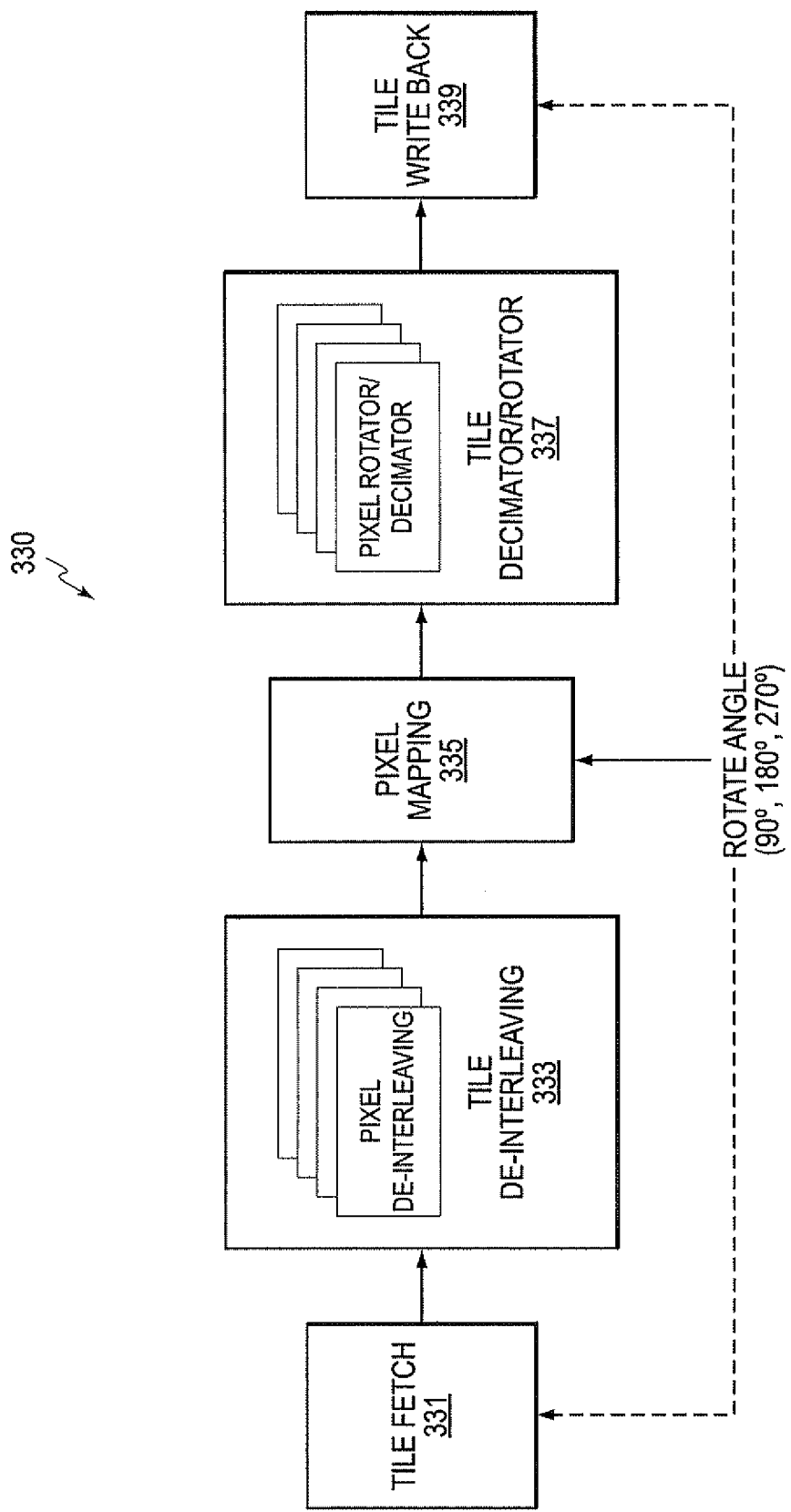
FIG. 3 shows a block diagram of a rotation pipeline example 330 according to an embodiment of the disclosure.

FIG. 3 shows a block diagram of a rotation pipeline example 330 according to an embodiment of the disclosure. The rotation pipeline 330 includes five stages: a tile fetch stage 331, a tile de-interleaving stage 333, a pixel mapping stage 335, a tile decimator/rotator stage 337, and a tile write back stage 339. Each of the stages can be performed by suitable components in the rotation module 220A and rotation module 220B. In an embodiment, the components are configured to enable the five pipeline stages to operate at the same time on different tiles, and thereby improve the throughput of the rotation module 220A and rotation module 220B.

The tile fetch stage 331 is configured to fetch tiles from a video frame source, such as an on-chip memory, an off-chip memory, and the like, and the fetched tiles are stored in suitable memory, such as a local memory, buffers, and the like. In an embodiment, the tiles are fetched in an order according to the rotation angle to rotate the tiles from a first orientation to a second orientation.

The tiles are in a packed format. In an example, a tile includes macro pixels that interleave neighboring pixels in the first orientation. The tile de-interleaving stage 333 de-interleaves each macro pixel into separate pixels. The pixel mapping stage 335 maps the pixels according to the rotation angle into neighboring pixels in the second orientation. In an example, the rotation angle is one of 90°, 180° and 270°.

The tile decimator/rotator 337 interleaves the neighboring pixels in the second orientation to generate new macro pixels (interleaved pixels) for the rotated tile. The new macro pixels include pixels that are interleaved in a direction that is different from the direction of the original interleaving. The tile write back logic 339 writes the rotated tile back to a video frame destination, such as an on-chip memory, an off-chip memory, and the like, based on the rotation angle.

Figure 4A:
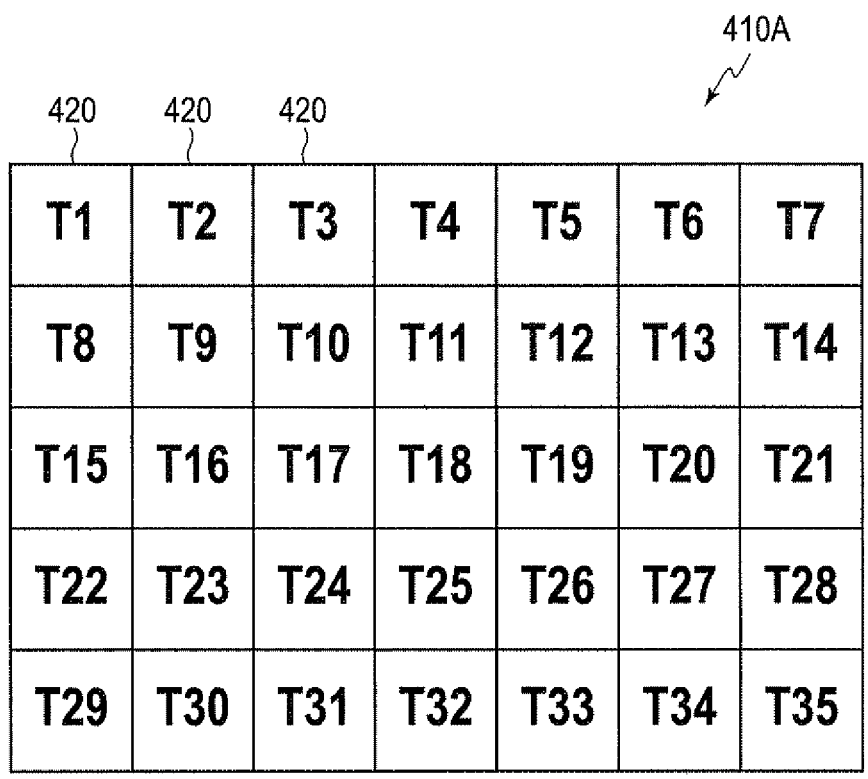

FIGS. 4A-4D show plots of tile based video frame rotation example according to an embodiment of the disclosure. FIG. 4A shows a plot 410A of a video frame according to an embodiment of the disclosure. The video frame is in a landscape orientation and is divided into a 5×7 matrix of tiles 420 T1-T35. In an example, each tile includes N×M tiles (N and M are even numbers), such as 2×2 tiles, 4×4 tiles, and the like.

Figure 4B:
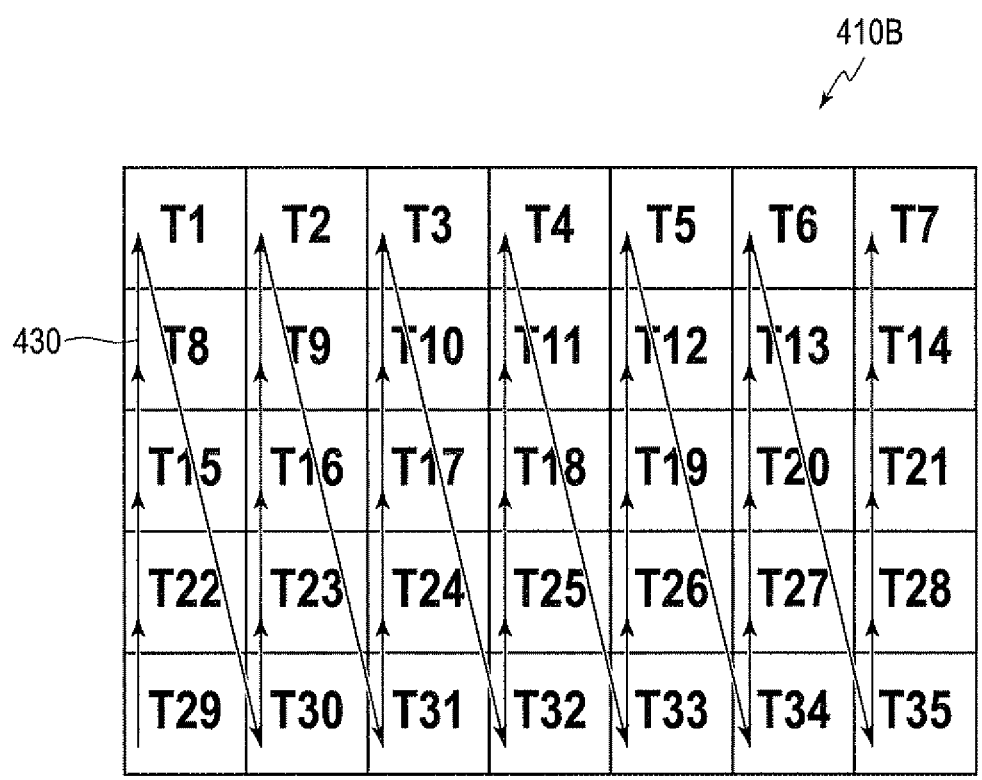

FIG. 4B shows a plot 410B having a fetching sequence 430 to fetch the tiles T1-T35 in the video frame. In an embodiment, the fetching sequence 430 is determined according to the rotation angle to enable efficient memory access in order to reduce system memory access latency.

FIG. 4C shows a plot 410C of the rotated video frame. It is noted that each tile of T1-T35 is rotated according to the rotation angle, such as 90° clockwise to generate T1' to T35'. The rotated tiles T1'-T35' are also arranged according to the rotation angle, such as 90° clockwise.

Figure 4D:
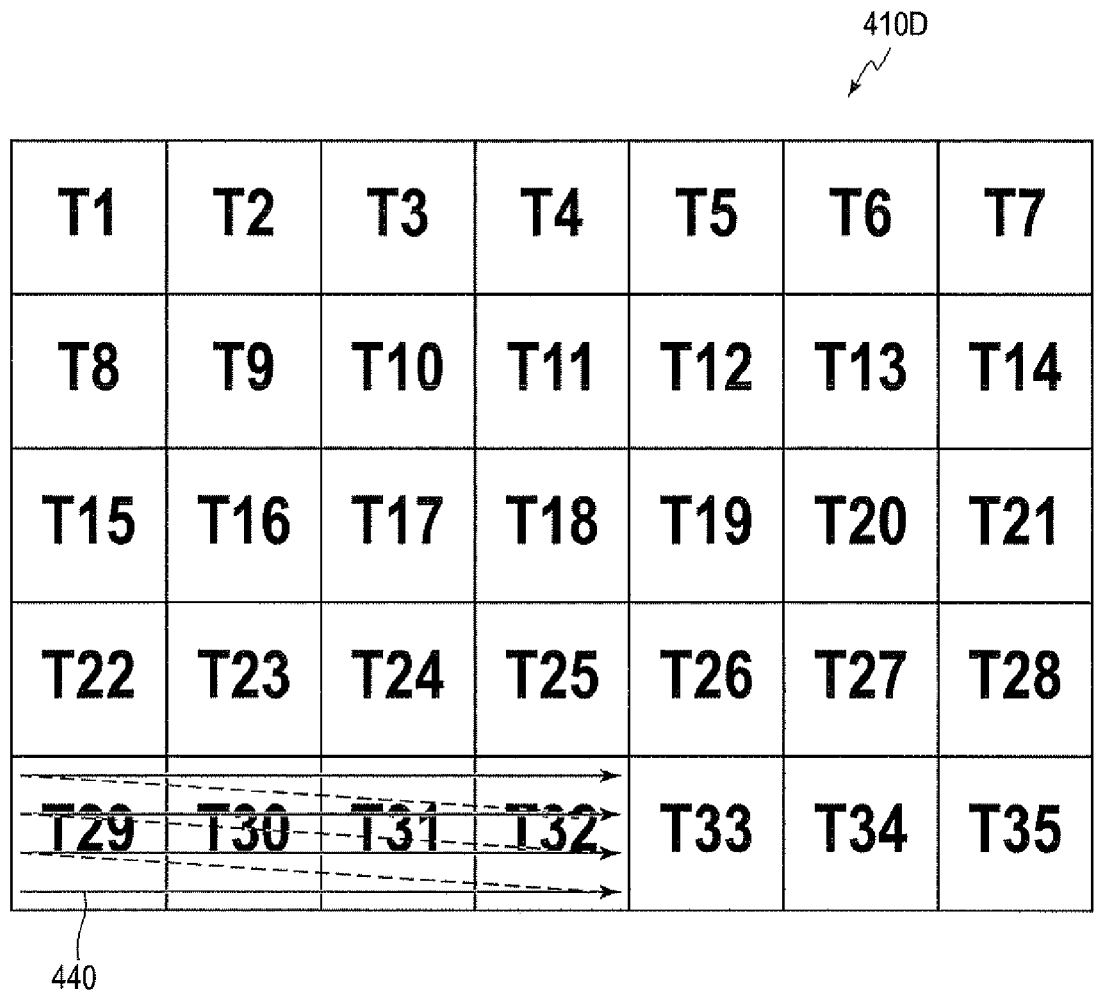

FIG. 4D shows a plot 410D having a memory access sequence 440 according to an embodiment of the disclosure. In the embodiment, each tile includes 4×4 pixels. The pixel data is stored in a memory in linear order corresponding to line by line in the landscape orientation. The memory access sequence 440 improves memory access order. For example, the memory access sequence 440 causes a relatively large portion of memory access to be sequential memory access, and thus reduces randomness of memory transactions, and reduces memory access latency.

FIGS. 5A-5F show a tile rotation example according to an embodiment of the disclosure.

Figure 5A:
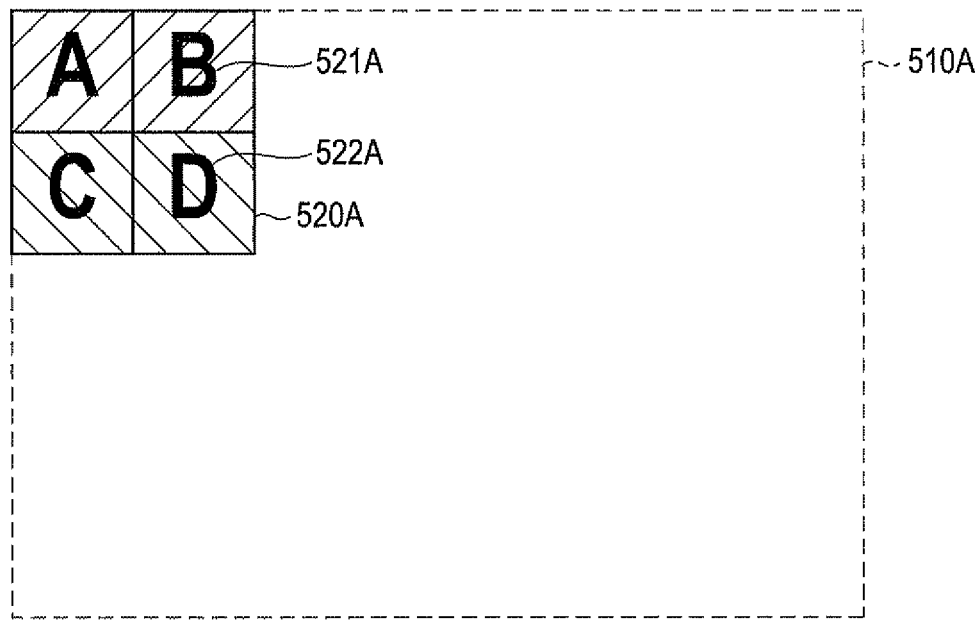

FIG. 5A shows a video frame example 510A. According to an embodiment of the disclosure, the video frame 510A has a native imaging orientation of landscape orientation. The video frame 510A is divided into tiles. Each tile includes a matrix of 2×2 pixels. In FIG. 5A example, tile 520A is located at the upper left corner of the video frame 510A. Tile 520A includes pixels A-D. Further, neighboring pixels in the landscape orientation are interleaved into macro pixels 521A and 522A. For example, pixel A and pixel B are interleaved to form a macro pixel AB, and the pixel C and the pixel D are interleaved to form a macro pixel CD.

Figure 5B:
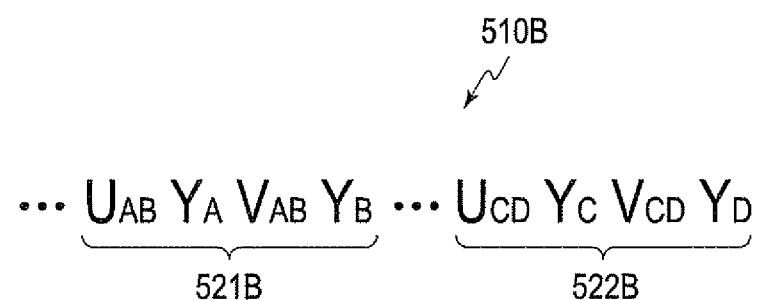

FIG. 5B shows a data stream 510B in YUV format corresponding to the video frame 510A. The data stream 510B includes a portion 521B corresponding to the macro pixel AB, and a portion 522B corresponding to the macro pixel CD.

FIG. 5C shows a de-interleaving example 510C according to an embodiment of the disclosure. The macro pixel AB and the macro pixel CD in FIGS. 5A and 5B are de-interleaved into separate pixels or pixel components. For example, the macro pixel CD is de-interleaved into pixel C and pixel D, and the macro pixel AB is de-interleaved into pixel A and pixel B. In an example, the de-interleaving can be implemented as registers and wires connecting the registers. For example, registers 511 are configured to store the macro pixel CD, and registers 513 are configured to store the macro pixel AB, registers 512 are configured to store two pixels C and D de-interleaved from the macro pixel CD, and the registers 514 are configured to store two pixels A and B de-interleaved from the macro pixel AB. Further, each arrow in the FIG. 5C is implemented as a group of wire paths from the outputs of the registers 511 and 513 to the inputs of the registers 512 and 514. In an example, when each of YUV components includes 8 bits, each arrow line in FIG. 5C represents eight wire paths.

Figure 5D:
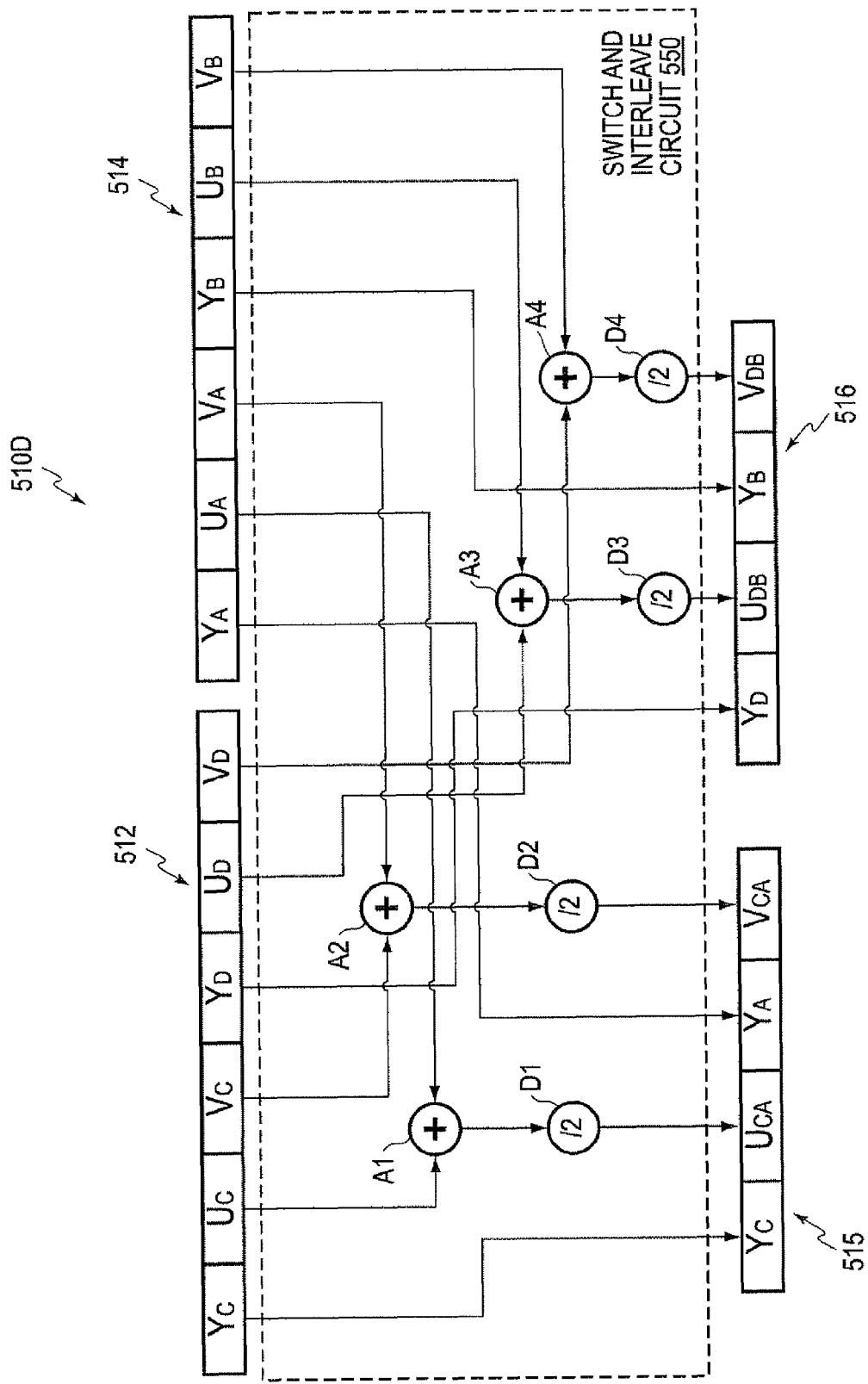

FIG. 5D shows an example circuit 510D to interleave pixels of a tile in a portrait orientation according to an embodiment of the disclosure. The pixel C and the pixel A that are adjacent to each other in the portrait orientation are interleaved to fowl a new macro pixel CA, and the pixel D and the pixel B that are adjacent to each other in the portrait orientation are interleaved to form a new macro pixel DB. In the FIG. 5D example, a switch and interleave circuit 550 is used to interleave the pixels in the portrait orientation. In an example, the switch and interleave circuit 550 includes a switch box (not shown) configured to map neighboring pixels according to a rotation angle from the landscape orientation to the portrait orientation. Further, the switch and interleave circuit 550 includes adders A1-A4 and divide-by-2 dividers D1-D4 to interleave neighboring pixels to generate new macro pixels. In an example, the divide-by-2 dividers D1-D4 are implemented using shifters that shift binary representation one bit to the right.

It is noted that the operation of the circuit 510D is also described in following equations:

$$MP_{CA} \cdot Y_C = P_C \cdot Y_C; MP_{CA} \cdot U_{CA} = \frac{P_C \cdot U_C + P_A \cdot U_A}{2};$$

$$MP_{CA} \cdot Y_A = P_A \cdot Y_A; MP_{CA} \cdot V_{CA} = \frac{P_C \cdot V_C + P_A \cdot V_A}{2};$$

$$MP_{DB} \cdot Y_D = P_D \cdot Y_D; MP_{DB} \cdot U_{DB} = \frac{P_D \cdot U_D + P_B \cdot U_B}{2};$$

$$MP_{DB} \cdot Y_B = P_B \cdot Y_B; MP_{DB} \cdot V_{DB} = \frac{P_D \cdot V_D + P_B \cdot V_B}{2};$$

where $MP_{CA} \cdot Y_C$ denotes a first Y portion of the macro pixel CA, $MP_{CA} \cdot Y_A$ denotes a second Y portion of the macro pixel CA, $MP_{CA} \cdot U_{CA}$ denotes U portion of the macro pixel CA, $MP_{CA} \cdot V_{CA}$ denotes V portion of the macro pixel CA, $MP_{DB} \cdot Y_D$ denotes a first Y portion of the macro pixel DB, $MP_{DB} \cdot Y_B$ denotes a second Y portion of the macro pixel DB, $MP_{DB} \cdot U_{DB}$ denotes U portion of the macro pixel DB, $MP_{DB} \cdot V_{DB}$ denotes V portion of the macro pixel DB, $P_A \cdot Y_A$, $P_A \cdot U_A$ and $P_A \cdot Y_A$ denote Y portion, U portion and V portion of pixel A, $P_B \cdot Y_B$, $P_B \cdot U_B$ and $P_B \cdot V_B$ denote Y portion, U portion and V portion of pixel B, $P_C \cdot Y_C$, $P_C \cdot U_C$ and $P_C \cdot V_C$ denote Y portion, U portion and V portion of pixel C, and $P_D \cdot Y_D$, $P_D \cdot U_D$ and $P_D \cdot V_D$ denote Y portion, U portion and V portion of pixel D.

Figure 5E:
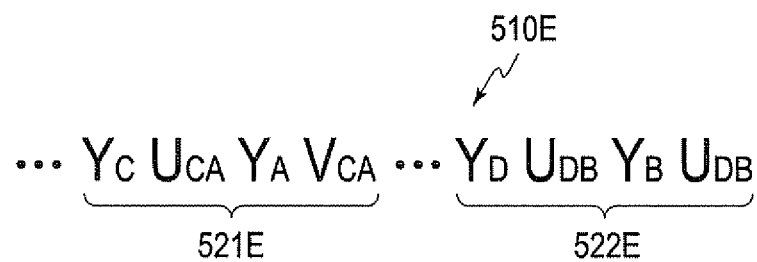

FIG. 5E shows a data stream 510E in YUV format corresponding to the rotated video frame. The data stream 510E includes a portion 521E corresponding to the macro pixel CA, and a portion 522E corresponding to the macro pixel DB.

Figure 5F:
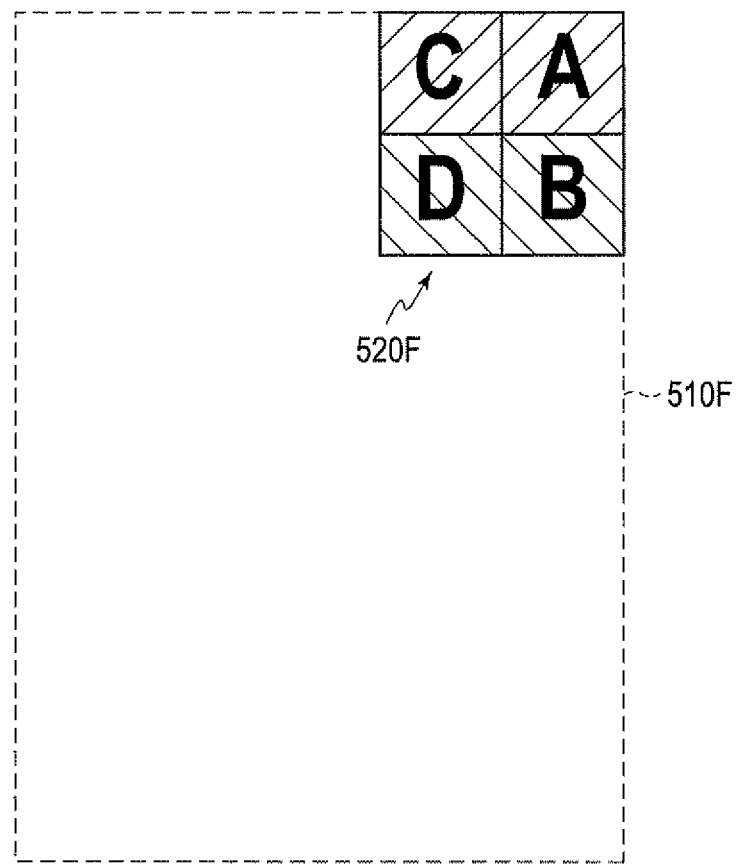

FIG. 5F shows the rotated video frame example 510F. In FIG. 5F example, tile 520F is rotated from tile 520A in FIG. 5A, and is now located at the upper right corner of the rotated video frame 510F. In tile 520F, pixel C and pixel A are interleaved to form a macro pixel CA, and the pixel D and the pixel B are interleaved to form a macro pixel DB.

It is noted that the example in FIGS. 5A-5F is a scenario for 90° clockwise rotation of a 2×2 tile. The figures, equations, and descriptions can be suitably adjusted for other rotation scenarios, such as 180° clockwise, 270° clockwise, 4×4 tile, 2M×2N tile (M and N are positive integers), and the like.

Figure 6:
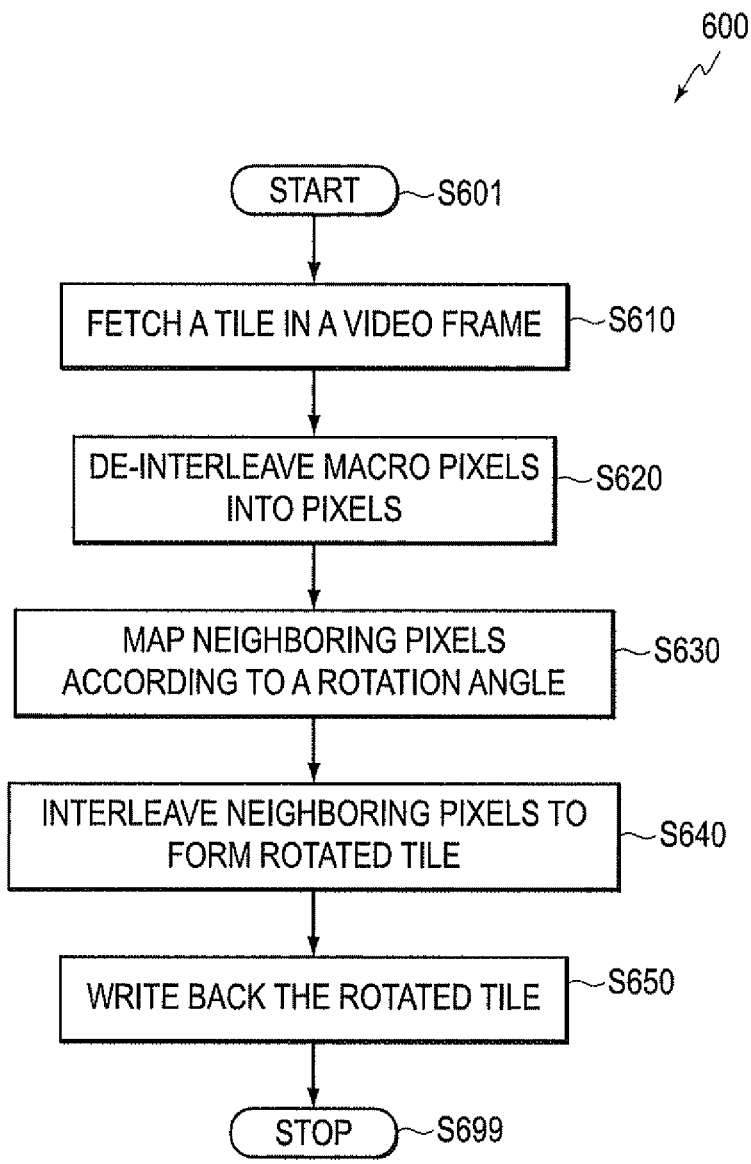
FIG. 6 shows a flow chart outlining a process example for video frame rotation according to an embodiment of the disclosure.

FIG. 6 shows a flow chart outlining a process example 600 for a rotation module, such as the rotation module 120, to rotate a tile of pixels in a video frame according to an embodiment of the disclosure. The process starts from S601 and proceeds to S610.

At S610, the rotation module 120 fetches a tile among a plurality of tiles forming a video frame. In an example, the tile is fetched according to an order based on a rotation angle. According to an aspect of the disclosure, the tile includes pixel data in a packed format, such as a YUV format. For example, YUV components of two neighboring pixels are interleaved into YUYV components of a macro pixel.

At S620, the rotation module 120 de-interleaves the macro pixels into separate pixels.

At S630, the rotation module 120 maps neighboring pixels according to the rotation angle. In an example, the rotation module 120 includes a switch box configured to map the neighboring pixels according to the rotation angle.

At S640, the rotation module 120 interleaves the newly mapped neighboring pixels into new macro pixels to form the rotated tile in the new, rotated, orientation.

At S650, the rotation module 120 writes the rotated tile back to a memory. In an example, the rotation module 120 writes the rotated tile back to the memory at an address determined based on the rotation angle.

It is noted that the steps in the FIG. 6 can be executed in a pipeline manner, such as using the rotation pipeline 330 in FIG. 3.

While the subject matter of the present disclosure has been described in conjunction with the specific embodiments thereof that are proposed as examples, it is evident that many alternatives, modifications, and variations will be apparent to those skilled in the art. Accordingly, embodiments of the present disclosure as set forth herein are intended to be illustrative, not limiting. There are changes that may be made without departing from the scope of the present disclosure.

What is claimed is:

1. A method for video frame rotation, comprising:
receiving by a circuit a first tile from among a plurality of tiles forming a video frame, the first tile including a first plurality of macro pixels where each macro pixel interleaves at least one pair of neighboring pixels in a first orientation and the interleaving makes a number of macro pixels less than that of neighboring pixels;
de-interleaving the first plurality of macro pixels into first pixels;
mapping the first pixels into first rotated neighboring pixels in a second orientation; and
interleaving the first rotated neighboring pixels into first rotated macro pixels forming a first rotated tile.

2. The method of claim 1, further comprising:
receiving a second tile from among the plurality of tiles forming the video frame, the second tile including a second plurality of macro pixels where each macro pixel interleaves at least one pair of neighboring pixels in the first orientation;
de-interleaving the second plurality of macro pixels into second pixels;
mapping the second pixels into second rotated neighboring pixels in the second orientation; and
interleaving the second rotated neighboring pixels into second rotated macro pixels forming the second rotated tile.

3. The method of claim 2, wherein the first tile and the second tile are processed in series or in parallel.

4. The method of claim 1, further comprising:
fetching the plurality of tiles from a storage that stores the video frame in a sequence according to a rotation angle to rotate the video frame from the first orientation to the second orientation.

5. The method of claim 1, further comprising:
writing the first rotated tile to a storage to store the rotated video frame at an address according to a rotation angle to rotate the video frame from the first orientation to the second orientation.

6. The method of claim 1, further comprising:
detecting that a video capturing device configured to generate the video frame according to the first orientation is positioned at the second orientation.

7. The method of claim 5, further comprising at least one of:
previewing the rotated video frame prior to video-encoding;
video-encoding the rotated video frame after video frame rotation;
decoding an encoded video frame before video frame rotation; and
displaying after video frame rotation of the decoded video frame.

8. The method of claim 1, wherein mapping the first pixels into the first rotated neighboring pixels in the second orientation further comprises:
mapping the first pixels into the first rotated neighboring pixels in the second orientation that is rotated from the first orientation by one of 90°, 180° and 270°.

9. The method of claim 1, wherein receiving the first tile of the video frame in the interleaved format further comprises:
receiving the first tile of the video frame in a packed YCbCr format.

10. A circuit, comprising:
an input buffer configured to buffer a first tile from among a plurality of tiles forming a video frame, the first tile including a first plurality of macro pixels that each macro pixel interleaves at least one pair of neighboring pixels in a first orientation and the interleaving makes a number of macro pixels less than that of neighboring pixels;
a first tile rotator configured to de-interleave the first plurality of macro pixels into first pixels, map the first pixels into first rotated neighboring pixels in a second orientation, and interleave the first rotated neighboring pixels into first rotated macro pixels; and
an output buffer configured to buffer the first rotated macro pixels to form a first rotated tile.

11. The circuit of claim 10, wherein the first tile rotator comprises:
a first de-interleaving circuit configured to de-interleave the first plurality of macro pixels into the first pixels;
a first switch circuit configured to map the first pixels into the first rotated neighboring pixels in the second orientation; and
a first interleaving circuit configured to interleave the first rotated neighboring pixels into the first rotated macro pixels.

12. The circuit of claim 10, wherein:
the input buffer is configured to buffer a second tile from among the plurality of tiles forming the video frame, the second tile including a second plurality of macro pixels that each macro pixel interleaves at least one pair of neighboring pixels in the first orientation;
a second tile rotator is configured to de-interleave the second plurality of macro pixels into second pixels, map the second pixels into second rotated neighboring pixels in the second orientation, and interleave the second rotated neighboring pixels into second rotated macro pixels; and the output buffer is configured to buffer the second rotated macro pixels to form a second rotated tile.

13. The circuit of claim 12, wherein the first tile rotator and the second tile rotator are configured to operate in parallel.

14. The circuit of claim 10, further comprising:

a memory interface configured to access a memory storing the video frame to fetch the first tile at a first address and access the memory to write back the first rotated tile at a second address based on a rotation angle between the first orientation and the second orientation.

15. The circuit of claim 11, wherein the first switch circuit is configured to map the first pixels into the first rotated neighboring pixels according to one of 90°, 180° and 270° rotation angles.

16. An electronic system, comprising:

a system on chip (SOC) having a video rotation circuit, the video rotation circuit comprising:

an input buffer configured to buffer a first tile from among a plurality of tiles forming a video frame, the first tile including a first plurality of macro pixels that each macro pixel interleaves at least one pair of neighboring pixels in a first orientation and the interleaving makes a number of macro pixels less than that of neighboring pixels;

a first tile rotator configured to de-interleave the first plurality of macro pixels into first pixels, map the first pixels into first rotated neighboring pixels in a second orientation, and interleave the first rotated neighboring pixels into first rotated macro pixels; and an output buffer configured to buffer the first rotated macro pixels to form a first rotated tile.

17. The electronic system of claim 16, wherein the first tile rotator comprises:

a first de-interleaving circuit configured to de-interleave the first plurality of macro pixels into the first pixels;

a first switch circuit configured to map the first pixels into the first rotated neighboring pixels in the second orientation; and a first interleaving circuit configured to interleave the first rotated neighboring pixels into the first rotated macro pixels.

18. The electronic system of claim 16, wherein:

the input buffer is configured to buffer a second tile from among the plurality of tiles forming the video frame, the first tile including a second plurality of macro pixels that each macro pixel interleaves at least one pair of neighboring pixels in the first orientation;

a second tile rotator is configured to de-interleave the second plurality of macro pixels into second pixels, map the second pixels into second rotated neighboring pixels in the second orientation, and interleave the second rotated neighboring pixels into second rotated macro pixels; and the output buffer is configured to buffer the second rotated macro pixels to form a second rotated tile.

19. The electronic system of claim 16, further comprising:

a camera sensor configured to capture the video frame, and send the video frame in the form of macro pixels interleaving neighboring pixels in the first orientation.

20. The electronic system of claim 16, wherein the SOC further comprises at least one of:

a video encoder/decoder configured to encode the rotated video frame after video frame rotation or to decode an encoded video frame before video frame rotation; and a display controller configured to receive the rotated video frame and enable the rotated video frame to be displayed.

* * * * *